United States Patent
Keska et al.

(10) Patent No.: US 6,371,665 B1
(45) Date of Patent: Apr. 16, 2002

(54) PLASTIC PACKAGED OPTOELECTRONIC DEVICE

(75) Inventors: Joseph P. Keska, Pittston Township, Luzerne County; Steven L. Moyer, Spring Township, Berks County; Mary J. Nadeau, Bethlehem; John William Osenbach, Kutztown, all of PA (US); Renyi Yang, Santa Barbara, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/344,656

(22) Filed: Jun. 25, 1999

(51) Int. Cl.$^7$ .................................................. G02B 6/36
(52) U.S. Cl. ........................................................ 385/93
(58) Field of Search ................................. 385/92, 93, 94

(56) References Cited

U.S. PATENT DOCUMENTS

| 4,726,648 A | 2/1988 | Haberland et al. | ......... 350/96.2 |
|---|---|---|---|
| 5,095,517 A | * 3/1992 | Monguzzi et al. | |
| 5,546,490 A | * 8/1996 | Kikuchi et al. | |
| 5,815,623 A | 9/1998 | Gilliland et al. | .............. 385/93 |
| 6,035,664 A | * 3/2000 | Hashizume | |

FOREIGN PATENT DOCUMENTS

| EP | 0 250 331 | 6/1987 | ............ G02B/6/42 |
|---|---|---|---|
| EP | 0 544 149 A1 | 6/1993 | ....... H01L/31/0203 |

OTHER PUBLICATIONS

European Search Report, Oct. 27, 2000.

* cited by examiner

Primary Examiner—Hung N. Ngo

(57) ABSTRACT

The invention is an optoelectronic device including an optical subassembly enclosed within a plastic housing. The housing includes a wall with an aperture and a lens mounted therein. A plastic receptacle is mounted to the wall. The receptacle includes an opening which is aligned with the lens and which is capable of receiving an optical fiber so that the fiber is aligned with light emitted from the optical assembly. The receptacle is preferably mounted to the wall by means of epoxy.

20 Claims, 4 Drawing Sheets

PLASTIC PACKAGED OPTOELECTRONIC DEVICE

FIELD OF THE INVENTION

This invention relates to optoelectronics and in particular to packaged optoelectronics devices.

BACKGROUND OF THE INVENTION

In the field of optoelectronics, it is common to form an optical subassembly including a laser and a ball lens on a silicon substrate. (See, e.g., Anigbo patent 5,881,193, which is incorporated by reference herein). Such an assembly is packaged so as to align the laser light with an optical fiber using another ball lens. (See, e.g., Osenbach et al., Electronics Components Testing Conference, Pg. 313–323, 1998.) The package is usually made of ceramic and/or metal, and the fiber is usually welded to the package. While generally adequate, such packages tend to be expensive, and the laser welding process is usually time-consuming.

It is, therefore, desirable to provide a low cost package with high speed active alignment between the optical devices and the optical fiber.

SUMMARY OF THE INVENTION

The invention is an optoelectronic device including an optical subassembly enclosed within a plastic housing. The housing includes a wall with an aperture and a lens mounted therein. A plastic receptacle is mounted to the wall. The receptacle includes an opening which is aligned with the lens and which is capable of receiving an optical fiber so that the fiber is aligned with light emitted from the optical assembly. The receptacle is preferably mounted to the wall by means of epoxy.

BRIEF DESCRIPTION OF THE FIGURES

These and other features of the invention are delineated in detail in the description to follow. In the drawing.

It will be appreciated that, for purposes of illustration, these figures are not necessarily drawn to scale.

DETAILED DESCRIPTION

Figure 1:
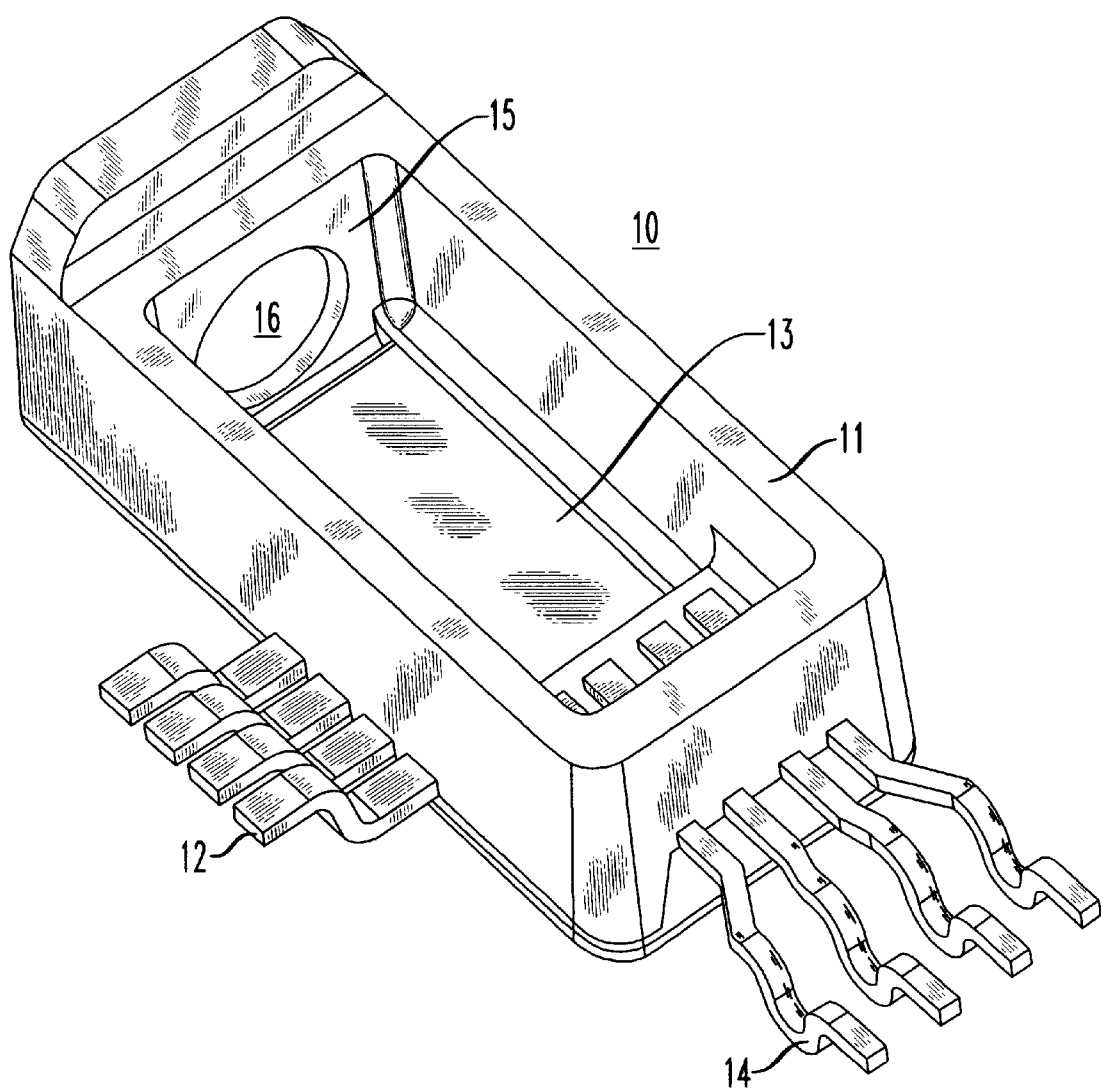
FIG. 1 is a perspective view of a portion of an optoelectronic device in accordance with an embodiment of the invention.
Figure 2:
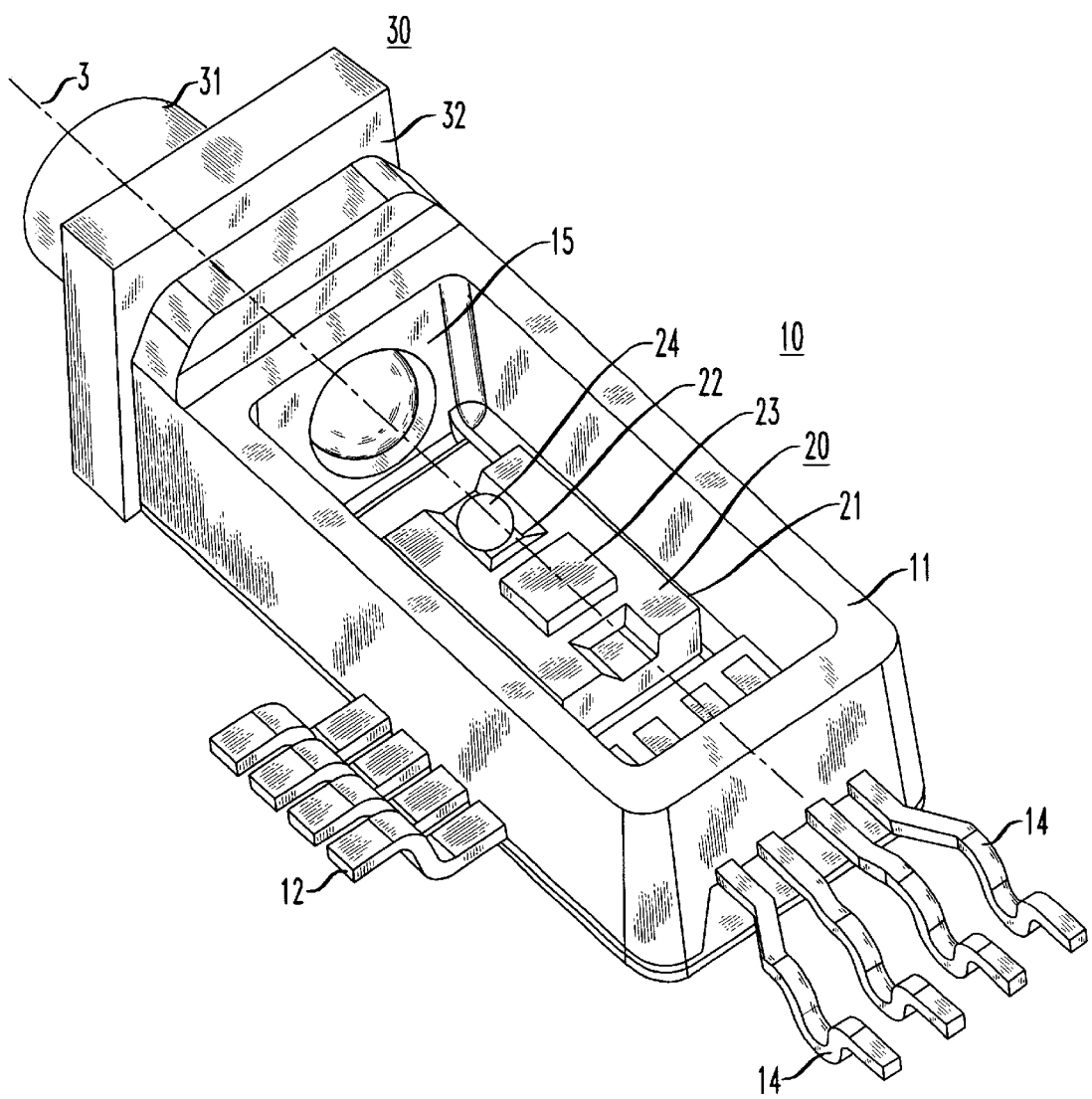
FIG. 2 is a perspective view of the device of FIG. 1 showing additional details.
Figure 3:
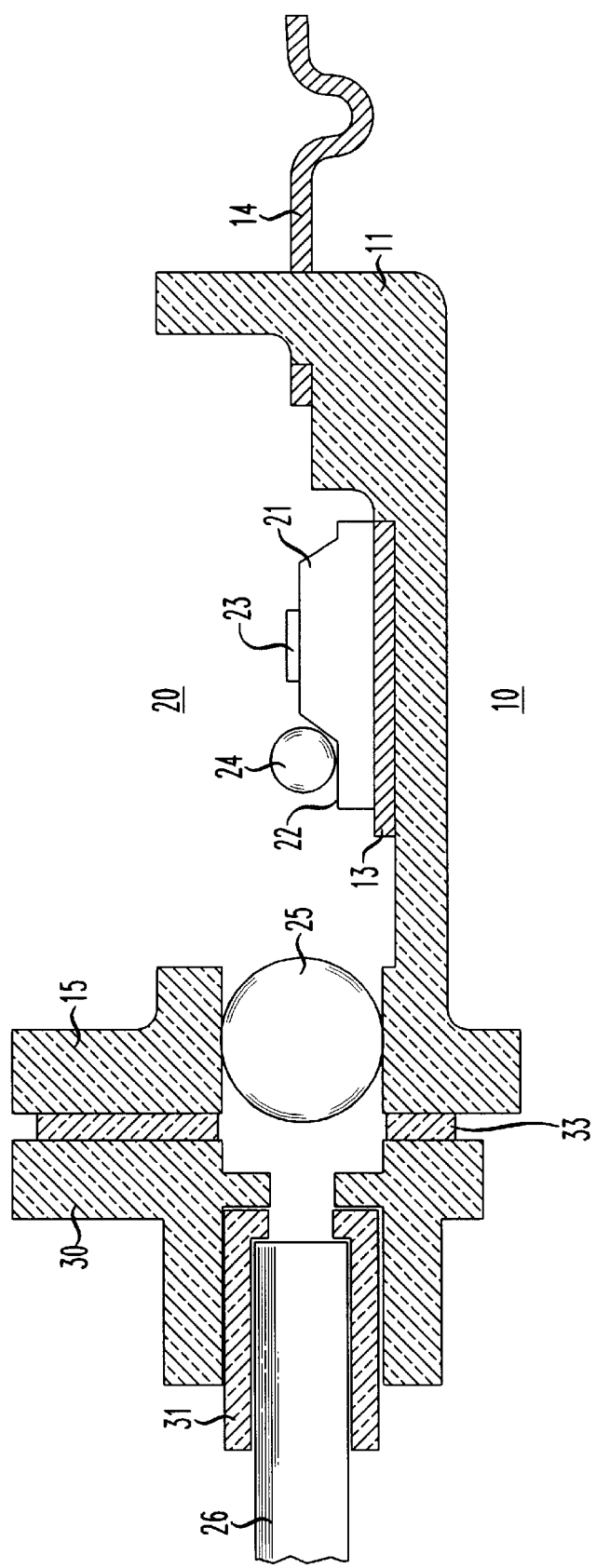
FIG. 3 is a cross sectional view taken along line 3—3 of FIG. 2.

FIGS. 1–3 illustrate in varying detail a typical optoelectronic device, 10, in this example a transmitter, in accordance with an embodiment of the invention. As illustrated in FIG. 1, a molded plastic housing, 11, is provided. The housing is typically made of polyphenylene sulfide (PPS) or other suitable plastic exhibiting high temperature stability which is considerably less expensive than the standard metal and ceramic housings. The housing includes a plurality of thermal leads, 12, extending out of the housing and thermally coupled to a heat sink, 13, placed on the bottom of the housing. The thermal leads, 12, and the heat sink are typically made of Au-plated Beryllium-Copper. A plurality of electrical leads, 14, also extend out of the housing and are positioned within the housing to provide electrical contact to an optical subassembly, to be described. The electrical leads are also typically made of Au-plated Beryllium-Copper. The housing, 11, also has a wall, 15, on one end which includes a circular aperture, 16, formed therethrough.

FIGS. 2 and 3 illustrate the housing populated with various optoelectronic components. In particular, an optical subassembly, 20, is bonded to the heat sink, 13, at the bottom of the housing, 11. A typical subassembly, 20, would include a silicon substrate, 21, with a cavity, 22, formed on one major surface. A semiconductor laser, 23, is bonded to the top major surface of the substrate, and a first ball lens, 24, is bonded in the cavity, 22. Electrical connections for driving the laser, 23, are provided by means of wire bonds (not shown) coupled to the leads, 14, and bonding pads (not shown) on the surface of the substrate. A second ball lens, 25, is press fit into the aperture, 16, in the wall, 15. The lenses, 24 and 25, are independently aligned to couple light from the laser, 23, to an optical fiber, 26.

Alignment of the light from the laser, 23, with the optical fiber, 26, is accomplished by first mounting the fiber, 26, within a plastic receptacle, 30, which is typically PPS, into which a ceramic ferrule, 31, typically made of cubic stabilized zirconia, is either press fit or insert molded. The fiber is inserted into the ferrule and held in place by the spring force of a standard connector (not shown). With the laser, 23, turned on, the receptacle, 30, is contacted to the outer surface of wall, 15, so that the opening in the ferrule, 31, is aligned with the opening, 16, in the wall, 15, and the fiber can receive the light from the laser. The receptacle, 30, is then moved around until the appropriate signal is transmitted through the fiber as measured by a commercially available optical power meter (not shown). At this point, the receptacle is fixed in position by bonding to the wall, 15, usually by means of an epoxy, 33. Thus, laser welding of the fiber is avoided.

Since the housing, 11, and receptacle, 30, are made of plastic, the resulting package is generally less expensive than standard metal and ceramic packages. Further, applicants have discovered that the housing and receptacle are sufficiently stable to permit effective optical alignment of free space components even when two independently aligned lenses, 24 and 25, are employed as part of the optical components.

Figure 4:
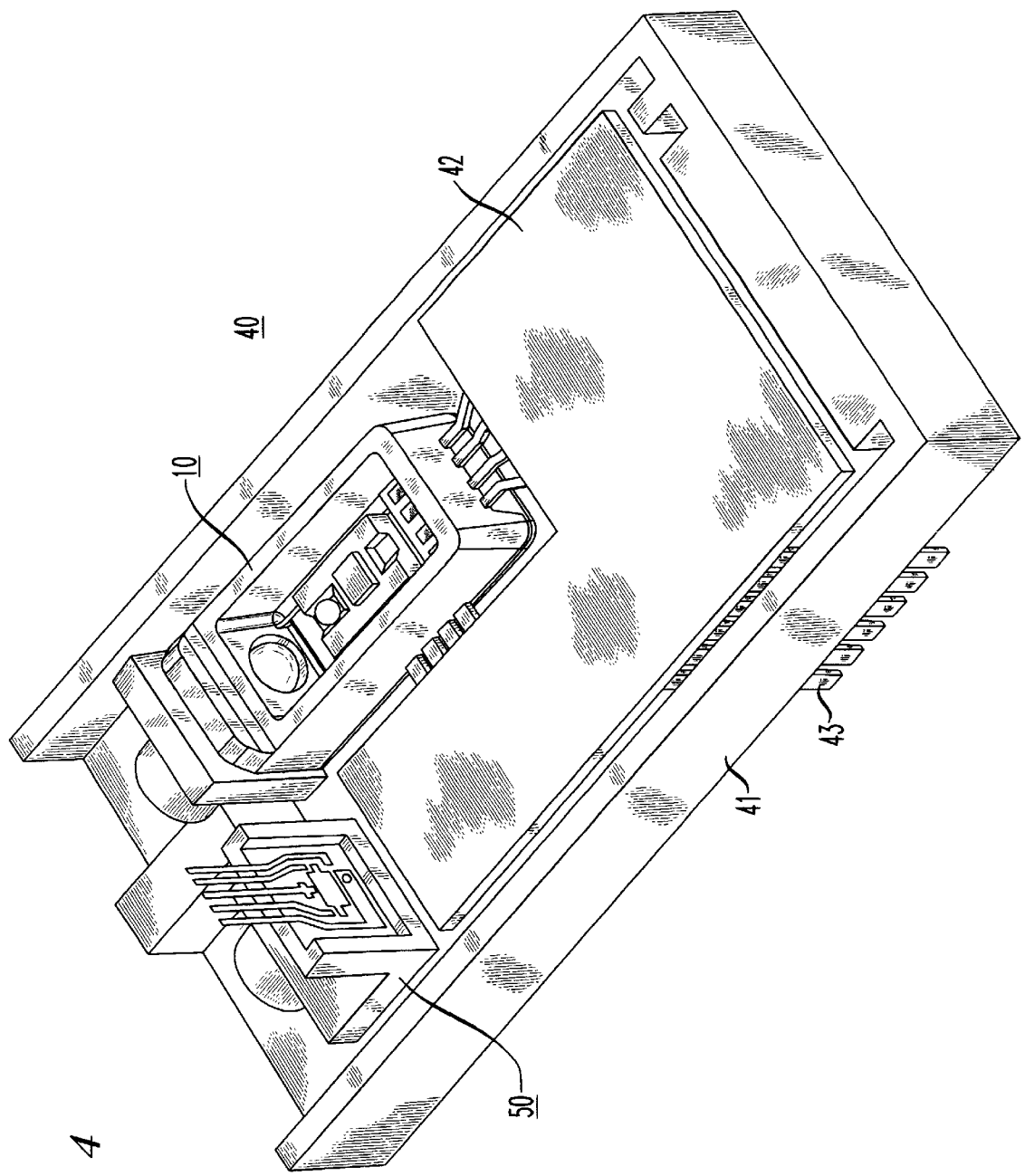
FIG. 4 is a perspective view of an optoelectronic device accordance with a further embodiment of the invention.

FIG. 4 illustrates an additional embodiment comprising a transceiver, 40. The transceiver, 40, includes a transmitter, 10, which may be identical to the transmitter previously described, and a receiver, 50, which may be identical to the receiver described in U.S. Patent Application of Keska, case 2-2-2-1-28-1-3, filed on an even date herewith. The transmitter and receiver are mounted side-by-side in an additional plastic housing, 41, which may also comprise PPS. As previously described, optical fibers (not shown) may be aligned with components of the transmitter and receiver. An integrated circuit board, 42, including the electronics for operating the transmitter and receiver is also mounted within the outer housing, 41. The electrical leads of the transmitter and receiver, e.g., leads 14 of the transmitter, are coupled to pads (not shown) on the circuit board, and the electronics on the circuit board are electrically coupled to components or power supplies outside the package by means of leads, e.g. 43, which may extend through the bottom of the housing, 41.

What is claimed is:

1. An optoelectronic device comprising:
   an optical subassembly enclosed within an enclosure defined by a plastic housing, the housing including a wall with a surface external to the enclosure and with an aperture, and a lens mounted therein; and a plastic receptacle mounted to the said surface of the wall, and external to the aperture the receptacle including an opening which is aligned with the lens and which is capable of receiving an optical fiber so that the fiber is aligned with light emitted from the optical assembly.

2. The device according to claim 1 further comprising an optical fiber mounted within the receptacle.

3. The device according to claim 1 wherein the optical subassembly includes a laser and a second lens mounted on a substrate.

4. The device according to claim 1 wherein the housing comprises polyphenylene sulfide.

5. The device according to claim 1 further comprising a ferrule mounted in the receptacle.

6. The device according to claim 1 wherein the receptacle is mounted to the wall by epoxy bonding.

7. The device according to claim 1 wherein the receptacle comprises polyphenylene sulfide.

8. The device according to claim 1 wherein the housing has a bottom and further comprising a heat sink mounted on the bottom.

9. The device according to claim 1 further comprising electrical leads extending through an additional wall of the housing.

10. An optoelectronic device comprising:

a first plastic housing including an optical transmitter and an optical receiver mounted therein, the transmitter comprising:

an optical subassembly enclosed within an enclosure defined by a second plastic housing, the second housing including a wall with a surface external to the enclosure and with an aperture and a lens mounted therein; and a plastic receptacle mounted to the said surface of the wall, and external to the aperture, the receptacle including an opening which is aligned with the lens and which is capable of receiving an optical fiber so that the fiber is aligned with light emitted from the optical assembly.

11. The device according to claim 10 further comprising an integrated circuit board mounted within the first housing and electrically coupled to the transmitter and receiver.

12. The device according to claim 10 further comprising an optical fiber mounted within the receptacle.

13. The device according to claim 10 wherein the optical subassembly includes a laser and a second lens mounted on a substrate.

14. The device according to claim 10 wherein the first and second housings comprise polyphenylene sulfide.

15. The device according to claim 10 further comprising a ferrule mounted in the receptacle.

16. The device according to claim 10 wherein the receptacle is mounted to the wall by epoxy bonding.

17. The device according to claim 10 wherein the receptacle comprises polyphenylene sulfide.

18. The device according to claim 10 wherein the second housing has a bottom and further comprising a heat sink mounted on the bottom.

19. A method of forming an optoelectronic device comprising the steps of:

mounting an optical subassembly within an enclosure defined by a plastic housing, the housing including a wall with a surface external to the enclosure and with an aperture and a lens mounted therein;

aligning light from the subassembly with an optical fiber included within a plastic receptacle by contacting the receptacle to said surface external to the aperture so as to receive light from the subassembly through the aperture, and moving the receptacle until an appropriate signal is transmitted through the fiber; and fixing the position of the receptacle by bonding the receptacle to the said surface.

20. The method according to claim 19 wherein the receptacle is bonded to the said surface by epoxy bonding.

* * * * *

UNITED STATES PATENT AND TRADEMARK OFFICE
CERTIFICATE OF CORRECTION

PATENT NO. : 6,371,665 B1
DATED : April 16, 2002
INVENTOR(S) : Joseph P. Keska et al.

It is certified that error appears in the above-identified patent and that said Letters Patent is hereby corrected as shown below:

<u>Title page,</u>
Item [73], Assignee should be -- Agere Systems Guardian Corp. --

Signed and Sealed this

Sixteenth Day of July, 2002

*Attest:*

*Attesting Officer*

JAMES E. ROGAN
*Director of the United States Patent and Trademark Office*